United States Patent
Nicholls et al.

(10) Patent No.: US 8,620,716 B2
(45) Date of Patent: Dec. 31, 2013

(54) COMPUTER SYSTEM AND METHOD FOR DETECTING AND PROCESSING CHANGES IN DATA

(75) Inventors: Charles Martin Nicholls, Windsor (GB); Paul Thomas, Spalding (GB)

(73) Assignee: SeeWhy, Inc., Boston, MA (US)

( * ) Notice: Subject to any disclaimer, the term of this patent is extended or adjusted under 35 U.S.C. 154(b) by 1371 days.

(21) Appl. No.: 10/538,225

(22) PCT Filed: Dec. 5, 2003

(86) PCT No.: PCT/GB03/05325
§ 371 (c)(1),
(2), (4) Date: Feb. 18, 2006

(87) PCT Pub. No.: WO2004/053754
PCT Pub. Date: Jun. 24, 2004

(65) Prior Publication Data
US 2006/0167704 A1 Jul. 27, 2006

(30) Foreign Application Priority Data
Dec. 6, 2002 (GB) .................................. 0228447.9

(51) Int. Cl.
*G06Q 30/00* (2012.01)
(52) U.S. Cl.
USPC ........................................................ 705/7.29
(58) Field of Classification Search
USPC ........................................................ 705/7.29
See application file for complete search history.

(56) References Cited

U.S. PATENT DOCUMENTS

| 6,574,605 B1* | 6/2003 | Sanders et al. ............... 705/7.26 |
| 6,757,689 B2* | 6/2004 | Battas et al. ........................... 1/1 |

(Continued)

FOREIGN PATENT DOCUMENTS

| EP | 0622729 A | 11/1994 |
| WO | WO 00/57311 A | 9/2000 |
| WO | WO 02/50633 A | 6/2002 |

OTHER PUBLICATIONS

ISA-dS95.01-1999, Draft 14 1999. "Enterprise-Control System Integration, Part 1: Models and Terminology", Instrument Society of America.*
Skeen, D., Enabling the Real-Time Enterprise, Byte, McGraw-Hill Inc., St. Peterborough, US, vol. 23, No. 1, Jan. 1998, pp. 51-52.
Skeen, D., Real-Time Queries in the Enterprise, Byte, McGraw-Hill Inc., St. Peterborough, US, vol. 23, No. 2, Feb. 1998, pp. 47-48.
International Search Report for International Application No. PCT/GB03/05325 dated Apr. 2, 2004.

*Primary Examiner* — Mark A Fleischer
(74) *Attorney, Agent, or Firm* — Knobbe Martens Olson & Bear LLP

(57) ABSTRACT

The system enables business people to understand the impact of business transactions, changes and events in real-time using advanced rules and analytics to filter, categorize and interpret the significance of streams of real-time information. Most business performance analysis today is done manually and this process is a time consuming and skilled task leading to a time delay in producing the analysis. This time lag between the transaction or event happening and being able to take action on the analysis is measured in weeks or months at many companies. By blending real-time information with historical data and performance goals, this system enables business users to assess business events and collaborate within teams to drive optimal business performance. Using forecasting techniques enables business managers to predict the likelihood of achieving a particular goal without relying on manual analysis by a skilled analyst. The system automatically updates the forecast based on real-time changing data, enabling the business manager to have an up to the minute and statistically valid projection of future business performance.

12 Claims, 16 Drawing Sheets

(56) References Cited

U.S. PATENT DOCUMENTS

| | | | |
|---|---|---|---|
| 6,847,854 B2 * | 1/2005 | Discenzo | 700/99 |
| 7,568,019 B1 * | 7/2009 | Bhargava et al. | 709/223 |
| 7,584,165 B2 * | 9/2009 | Buchan | 706/60 |
| 7,720,727 B2 * | 5/2010 | Keyes et al. | 705/30 |
| 2002/0046245 A1 | 4/2002 | Hillar et al. | |
| 2002/0107957 A1 * | 8/2002 | Zargham et al. | 709/224 |
| 2002/0165903 A1 * | 11/2002 | Zargham et al. | 709/202 |
| 2003/0033191 A1 * | 2/2003 | Davies et al. | 705/10 |
| 2003/0046130 A1 * | 3/2003 | Golightly et al. | 705/7 |
| 2004/0111346 A1 * | 6/2004 | Macbeath et al. | 705/35 |

* cited by examiner

COMPUTER SYSTEM AND METHOD FOR DETECTING AND PROCESSING CHANGES IN DATA

FIELD OF INVENTION

The invention relates to using rules and analytics to filter, categorize and interpret the significance of streams of real-time information, particularly in view of historical data stored in a database.

BACKGROUND OF THE INVENTION

This invention relates in general to processing of data in computer systems, and more specifically to a system for detecting and interpreting transactions, events or changes in data in computer systems.

There is great commercial value to businesses in being able to detect significant events or transactions, from thousands or hundreds of thousands daily, and in interpreting their significance in real-time or near real-time. Knowledge that one particular customer order was smaller than usual, can lead to a much greater likelihood of the business missing its revenue targets, and leads to a whole chain of effects throughout the supply chain. Timely knowledge of the significant of this particular event buys the business time to replace the missing value from the smaller order with orders from other customers, and/or slow manufacturing processes to fit the new likely demand, and defer reordering supplies and components.

The traditional approach to managing business performance is to compile data from different computer systems into a computer database often called a data warehouse. This is a repository for information about the business, and typically stores large numbers of facts about the business. Business analysts then use analysis software to sift through the data in order to understand business performance.

Most data warehouses today are updated on a weekly basis, with some updated daily, and in general are not designed for analyzing real-time data. Most data warehouse systems are also not designed to detect what has changed from previously, or to highlight to the business users significant transactions or events which could affect the business' ability to achieve its performance targets. As a result, most business performance analysis today is done manually—but this process is time consuming and a skilled task leading to a time delay in producing the analysis. This time lag between the transaction or event happening and being able to take action on the analysis is measured in weeks or months at many companies.

In most businesses today there is considerable pressure on management to have greater visibility into the future performance of the business. The ad hoc nature of today's manual analysis process also leads to a lack of consistency in how the data should be interpreted. Rarely are corrective actions, identified by one department of the business, taken in isolation of other departments. Other departments may be responsible for pieces of the business process, and to may even have performed their own analysis, and reached different conclusions as to the appropriate actions that need to be taken. These types of disagreements between departments, or managers, typically cause the remedy for the problem to be delayed while agreement is reached. Today, these negotiations and discussions typically happen in a way completely disconnected from the data and the analysis, and may involve email and other forms of communication. Thus it is highly desirable to provide a system which links these two processes together.

There is great value in business today, due to shorter business cycles, greater competition, and pressure from the investor community to identify problems and implement corrective actions as rapidly as possible. Therefore there is great value in speeding the correct interpretation of the data, and in speeding the collective understanding of the problem across departments within a business.

SUMMARY OF THE INVENTION

An object of this invention is to increase the predictability of businesses, and collective understanding of the business performance, enabling management to tune the appropriate business processes in response a rapidly changing business environment and business events.

Accordingly, this system provides software for use by business men and women to monitor the performance of the business, or their area of responsibility within the overall business, by defining and using some or, preferably, all of metrics, goals (also known as business targets), rules, alerts, and dashboards to facilitate analysis of business performance by themselves and by others.

Specific aspects of the invention are described in the claims. Other aspects, embodiments, advantages and preferred features will be apparent from the description, claims and drawings.

The present invention provides a computer system for analyzing, processing publishing data relevant to the performance of a business or organization. A preferred embodiment of the present invention is provided in a suite of software programs. As will be seen, any suitable applications can be used to implement some different facets of the system of the present invention.

By blending real-time information with historical data and performance goals, the preferred embodiment of the invention enables business users to assess business events and collaborate within teams to drive optimal business performance. Using forecasting techniques enables business managers to predict the likelihood of achieving a particular goal without relying on manual analysis by a skilled analyst. The embodiment automatically updates the forecast based on real-time changing data, enabling the business manager to have an up to the minute and statistically valid projection of future business performance.

As used herein, "Metrics" are reusable expressions of measures of business performance, for example Revenue or Days Sales Outstanding. Metrics are typically stored in a database to enable analysis of performance over time, and to facilitate the understanding of seasonality and cyclical patterns of performance of the business or a division thereof.

"Goals" are re-usable expressions of business targets by which the business judges performance, for example target Revenue for the third quarter, or the goal for the number of Days of Sales Outstanding that the business is striving to achieve. Goals are typically stored in a database to enable analysis of performance to compared with targets over time.

"Rules" are business conditions which describe particular conditions or patterns of conditions which hold particular meaning or significance for the business, a department of the business or for a particular business user. For example, when stock falls below minimum order quantity, then reorder is an explicit rule. An example of a simple pattern would be when stock falls below minimum order quantity, and if orders are forecast to achieve target, then reorder. In addition to these simple rules, the invention incorporates rules which use mathematical techniques including, but not limited to, statistical and artificial intelligence techniques to determine whether a particular event is significant, or part of the normal pattern of business.

"Alerts" are one type of action triggered by one or more rules or a pattern of business events or transactions. A simple example for illustration purposes might be that when stock falls below minimum order quantity, and if orders are forecast to achieve target, then alert the purchasing manager as suggest reordering. The alert can take many forms including but not limited to an on screen device in the dashboard presentation, an e-mail, text message, and voicemail.

"Dashboards" are graphical presentation user interfaces which use graphs, charts, maps, dials and other software devices to make it simple for business users to understand data and put it in context.

BRIEF DESCRIPTION OF THE DRAWINGS

Embodiments of the invention will be illustrated, by way of example only, with reference to the accompany drawings in which.

EXAMPLE APPLICATION OF THE INVENTION

An example, for the purposes of illustration, is given to show how the invention might be used: A major retailer struggles to identify which 'Key Items' are selling faster than expected, and to coordinate the appropriate actions by the inventory management, marketing, merchandising and retail management teams.

Implementing the invention automatically identifies that Red Men's 36"-42" Fleece Jackets are selling much faster than expected, leading to a likely stock out situation 4 weeks before additional stock will be delivered. The inventory manager sees the alert triggered by today's sales data, and changes the sizes and quantities on order. He records his action which automatically appears on the dashboards of the merchandising and marketing managers concerned. The merchandising manager sends an email (with link to the discussion thread) to all store managers instructing that the Red Fleece Jacket is removed from the window display pending delivery of additional stock. The marketing manager, at the last minute pulls the Red Jacket from the promotional catalogue, and increases the price.

DETAILED DESCRIPTION OF A PREFERRED EMBODIMENT

Figure 16:
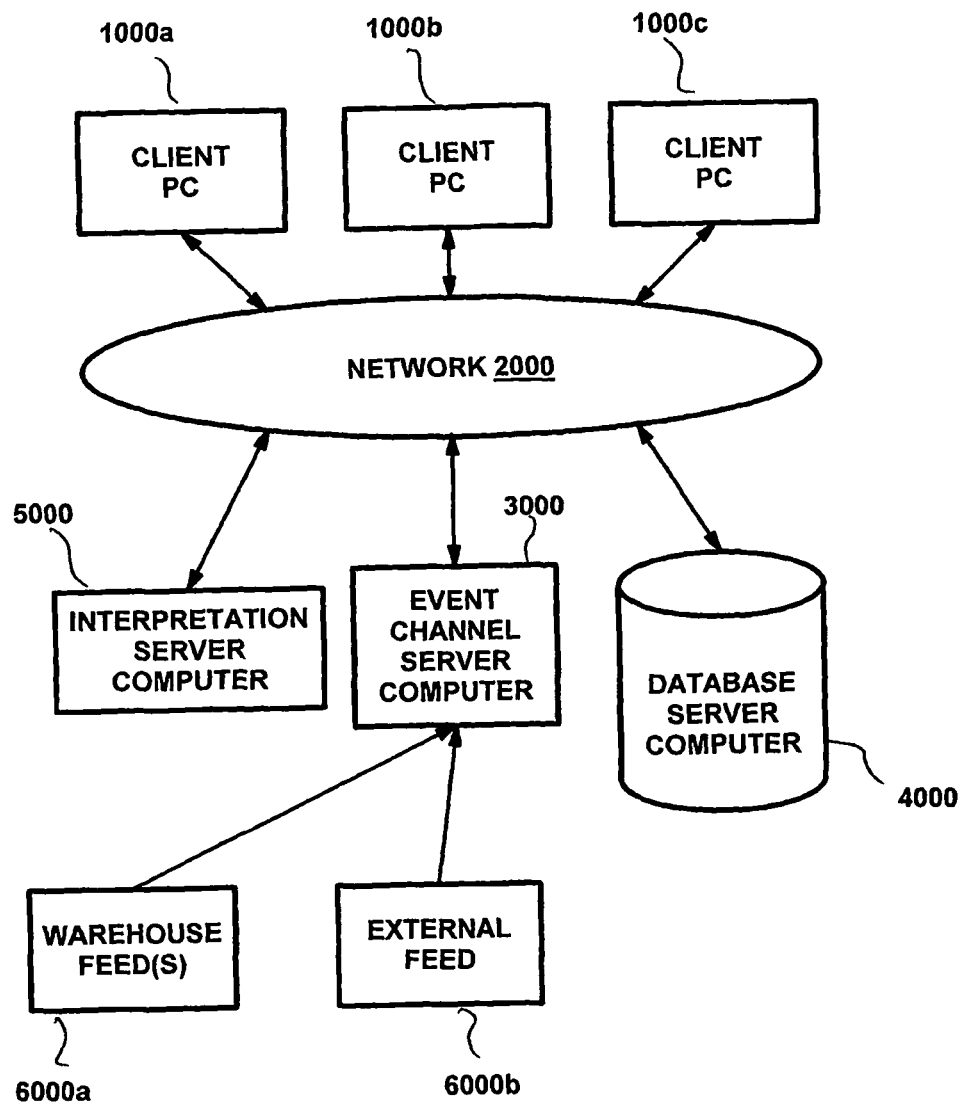
FIG. 16 is a block diagram showing the hardware elements used to implement an embodiment of the invention.

Referring to FIG. 16, in an embodiment of the invention, a number of business users within an enterprise (e.g. a business, or an organisation, team or group within a business) each have a terminal 1000, such as a personal computer, which acts as a client device. For example, the terminal 1000a may belong to an inventory manager; the terminal 1000b may belong to a merchandising manager and the terminal 1000c may belong to a marketing manager. It is envisaged that a large number of business people within the organisation will each have a terminal 1000. The terminal 1000 runs a browser application, which displays a user interface in the manner discussed in greater detail below. It also runs an email or instant messaging client program, such as Microsoft Outlook™.

Each of the terminals 1000 communicates with a network 2000. The network may comprise a local area network (LAN) or wide area network (WAN), provided over dedicated cabling, or telephone company lines. The network 2000 may equally encompass the Internet. The terminals are arranged to update the browser in real-time—they may be arranged automatically to reload the browser repeatedly, or to poll the network for new pages, or be driven by events such as alerts for example.

Also communicating with the network 2000, and hence with each other and with the terminals 1000, are an event channel server computer 3000; a database server computer 4000; and an interpretation server computer 5000. The roles of these will be discussed in greater detail below. These computers might be on the same physical computer, or may be distributed across different computers for increased throughput/performance.

The event channel server computer 3000 is arranged to receive data in event-driven fashion from any middleware or web service connected to diverse sources 6000 such as warehouses or stock control computers provided within the company (shown generally as 6000a) and external feeds from organisations such as Reuters™, Tibco™, Bloomberg™ and so on which publish data updated in real-time on various topics (e.g. share prices, commodity prices, and so on but not limited to financial data), shown generally as 6000b. The events are typically notified to the event channel server computer 3000 through middleware programs, which may operate through communications networks (either the network 2000 or additional networks).

In this embodiment, the database server computer 4000 stores historical data, based on the new raw business data arriving at the event channel server 3000 (and other data calculated from it as discussed below) and historical data imported from data warehouses, other database systems or middleware or tools.

The contents of the database 4000 may be initialised by extracting data from an existing company data warehouse, to provide a starting point. Subsequently, the live data values from the feeds, together with the metrics calculated from them, are stored in the database server computer, so as to provide a rich historical database.

The event channel server computer 3000 forwards events to the interpretation server computer 5000.

The interpretation server computer 5000 takes an event (for example, a new stock volume, or a new commodity price), and calculates a series of results using the data carried by the event message, together with the historical data from the database server 4000. The results comprise metrics; rules based on the metrics; and alerts based on the rules.

For example, a new stock volume datum may be combined with other stock volumes to calculate an average stock level metric, which is then compared to a fixed level in the application of a re-ordering rule, so as to indicate that a reorder should take place if the metric is below the level. This in turn may trigger an alert if the reorder rule is satisfied.

The interpretation server computer 5000 includes a record for each metric it calculates, which indicates the event(s) and data sources within the database server computer within which the metric is calculated, together with the way in which the data sources are combined to provide the metric. To take a simple example, the metric might be an average data value over a month, in which case it is calculated as the sum of the current value from the event channel plus the month's historical values from the database server computer.

Associated with each metric record is a metric prediction record. The metric prediction record defines the data sources within the database server computer 4000 from which a prediction of the current value of the metric can be calculated, together with the method for calculating the current value from those data sources.

For example, the predicted current value may be calculated as an extrapolation based on linear regression (or any other statistical or mathematical technique) from historic values of the same data item, or on a more complex basis which takes into account daily or seasonal fluctuations, or other patterns within the data. The predicted value of the metric may be calculated using machine learning or adaptive techniques, including but not limited to as neural network or other artificial intelligence techniques.

The records defining the metrics are programmed initially by a business analyst. They provide data which gives a model of the operations of the business. The interpretation server 5000 constantly recalculates and updates the expected and predicted values of the metrics, so as to keep a real time model of the expected and predicted state of the business. Whenever a new event carrying actual data arrives on the event channel server 3000, the expected and predicted model is updated using the new real data, by recalculating all metrics which depend on that new raw data. Metrics can be calculated using a mixture of the new raw data and the predicted value of other data. The effect of this is that the alert thresholds adapt automatically as the underlying patterns of data change over time.

Target values for specified metrics at specified points in time (or over specified time periods) can be set. The predicted model is repeatedly compared with the target values set for each metric, to determine whether the business is on track or not. When some rule is satisfied (for example, where the predicted or actual value of the metric deviates by more than a certain amount from its target value at a certain time) an alert can be generated.

The interpretation server computer 5000 stores a record defining each alert in terms of the rule on which it is based and the action which is to be taken. It also carries a record for each rule, specifying the metrics on which the rule is based, and the rule which is applied to those metrics. The definitions of the metrics, rules and actions may be in XML, and are hence relatively easily defined and updated by users with only a moderate knowledge of information technology (IT).

Each metric is linked to a record for the kind of object which it applies. For example, the metric for the price of a certain fleece jacket and the metric of the volume of that fleece jacket held in a warehouse, are both linked to a record for that fleece jacket. The record for that type of fleece jacket contains data indicate that it is a specific type of jacket (e.g. a pointer to a record for a "jacket" record) which in turn indicates that it is a type of article of clothing, which in turn indicates that it is a stock item.

An addition of a new size of fleece jacket which appears first as a new type of event is automatically monitored without any operation intervention. As data appears for this new size, a new metric dimension is automatically created and tracked over time. Additionally, expected values are automatically calculated as the new dimension inherits the properties of the metric.

The system stores a directory database which links individual terminals 1000a, 1000b, 1000c, or their users, to types of object. For example, the record for a given type of fleece jacket will be linked to the sales person responsible for that jacket, the marketing person responsible for that jacket, the stock control person responsible for that jacket and so on. Additionally, the higher level records for jackets in general and clothing in general will be linked to the personnel responsible at that higher level of granularity.

When an event is received which relates to a particular object, such as the price or stock of the particular type of jacket, then the calculated alerts, predicted and actual metric values, and so on, can be transmitted to the terminals of the staff affected, by accessing the directory database to determine the staff associated with that object, and staff associated with more generic versions of that object.

Figure 1:
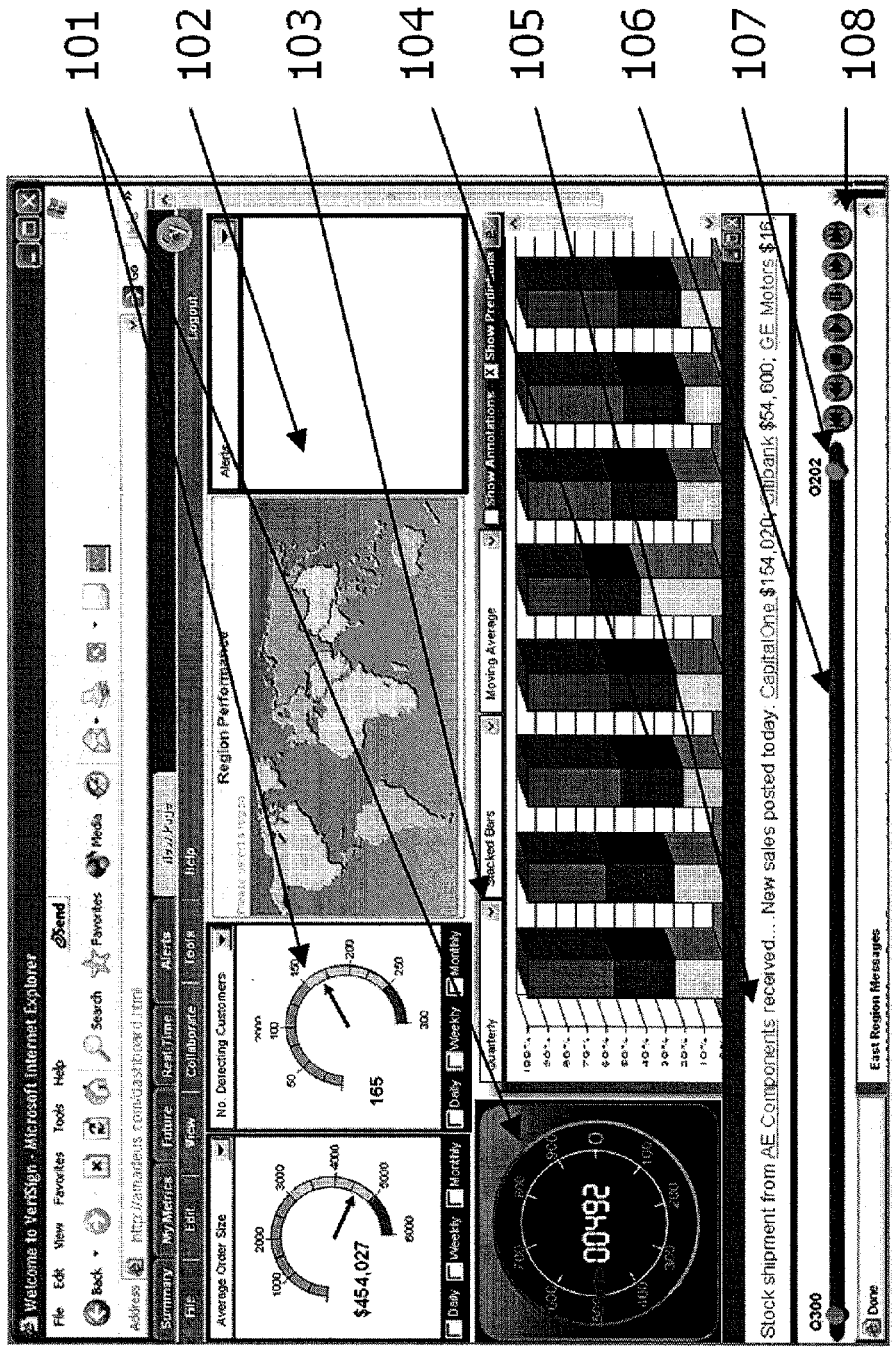
FIG. 1 shows an example dashboard user interface of a first embodiment.

FIG. 1 shows an example of user interface which represents a dashboard type display. In FIG. 1, 101 shows a graphical dial which illustrates the performance of a particular metric. The different colors on the dial represent thresholds of performance, and may be linked to specific goals. Rectangle 102 represents "alerts" where business rules have been met or broken triggering an alert to a particular condition of the business. Rectangles 103 and 104 represent a different metric where each column 104 represents a point in time. Rectangle 103 represents a device where the user can reconFigure the display of data 105 by changing the interval between points in time, for example from quarterly to monthly, or from daily to hourly;
changing the type of display 104;
using statistical techniques to spot patterns or trends by applying, for example for the purpose of illustration, smoothing algorithms or presenting the data as moving averages.

Rectangle 105 represents a "stock ticker" type display where transactions are scrolling across the panel. In this panel the words "AE Components" represents one particular transaction, and is also a hyperlink. This hyperlink enables the user to see the detail behind the individual transaction by selecting this hyperlink. This user interface displays only those transactions which are significant to the user. Transactions which are not significant are filtered out using a combination of rules, statistical and artificial intelligence techniques, but are still recorded in the database.

Rectangle 106 represents a time bar which controls the time period being viewed on the screen. The user is able to change the time period by adjusting sphere 107 or buttons 108.

Figure 2:
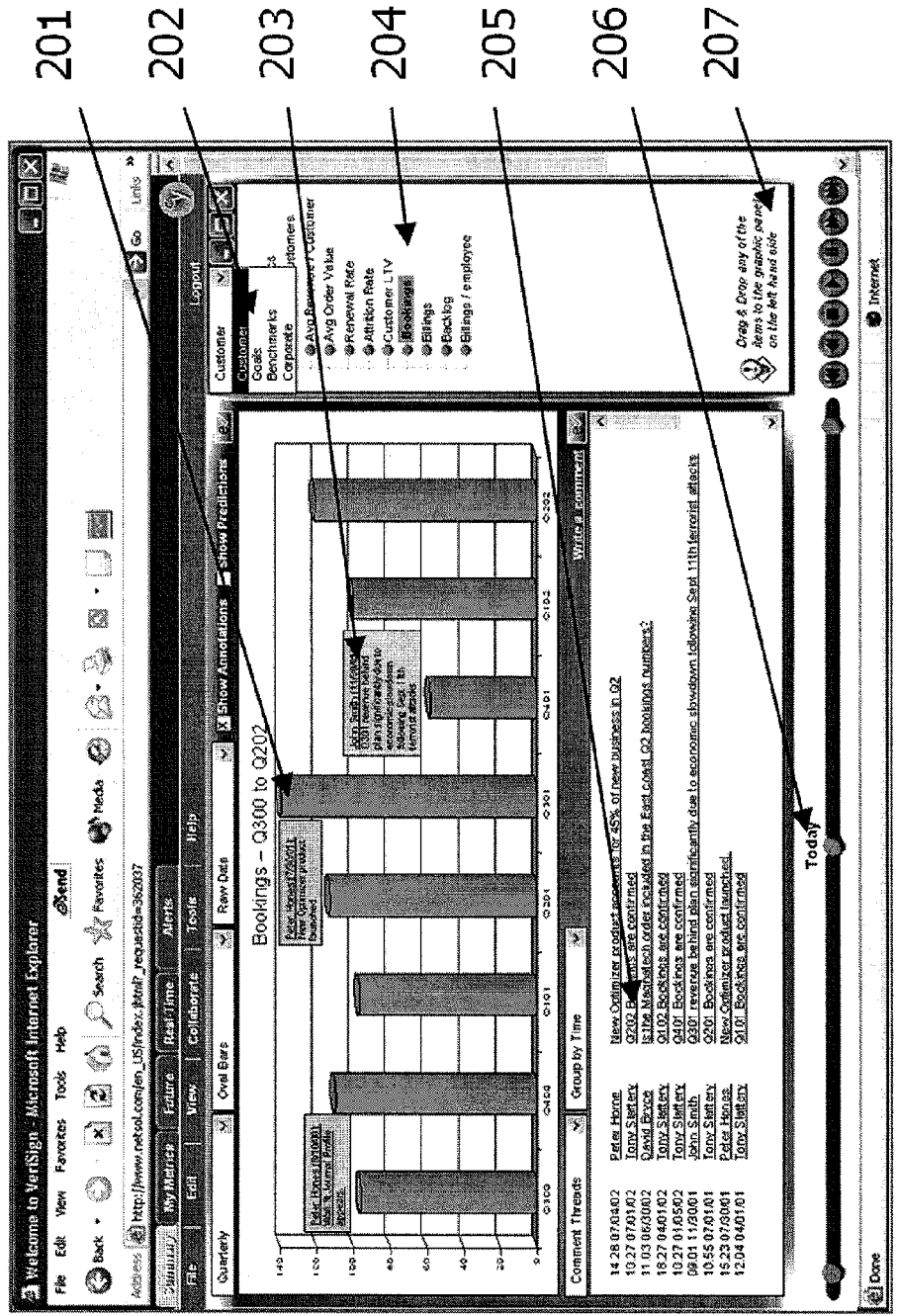
FIG. 2 shows an example user interface of the first embodiment showing message threads linked to metrics and targets.

FIG. 2 shows an example of user interface which represents message threads linked to metrics and targets.

In FIG. 2, 201 represents different metric where each column 201 represents a point in time. 202 shows how different metrics are grouped together into categories for ease of understanding and navigation by the user. Rectangle 203 shows an annotation linked to one particular metric and one point in time, in this particular case "Q401 bookings." Note that the annotation has been entered by one user "John Smith" and that the time and date is automatically recorded. This annotation also is recorded and displayed in the message threads rectangle 205 automatically by the system.

Rectangle 204 shows how different categories of metrics can be displayed in rectangle 204. The metrics shown are "customer" metrics, and the metric selected is "Bookings." Selecting a different metric in rectangle 204 would have the effect of changing the graphical display 201 to display the metric selected, and would change the message threads 205 displayed below. Equally, any metric can be dragged from rectangle 204 onto the graphical display 201 and dropped to the same effect. Note that multiple metrics, or metrics and goals or benchmark data can be simultaneously selected, which would have the effect of changing the graphical display 201 to display all of the metrics selected, and would change the message threads 205 to display all of the message threads related to the metrics selected.

Rectangle 205 shows the display of messages, comments and annotations linked to the metric selected in 204 and the time period being viewed as defined in 206. In FIG. 2, 205 is showing discussion about the metric "Bookings" during the time period "Q300 to Q202."

Rectangle 207 represents a time bar which controls the time period being viewed on the screen.

FIG. 2, reference 208 shows a tool tip which gives help to the user as to what to do. This tool tip is illustrative of different types of tips in interpreting the data, or in using the software.

Figure 3:
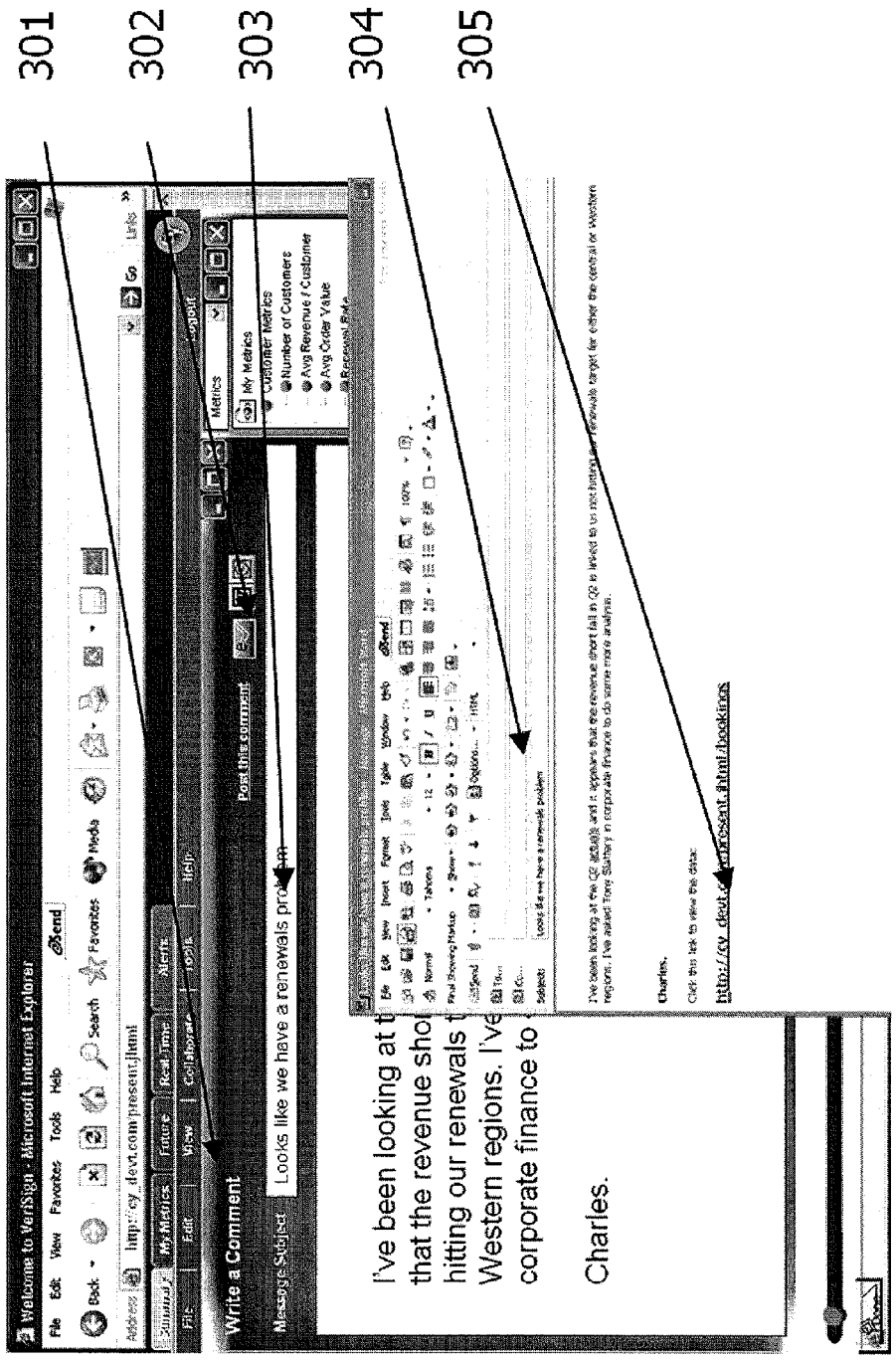
FIG. 3 shows an example user interface of the first embodiment showing integration of message threads with their party email systems.

FIG. 3 shows an example of user interface which represents integration of message threads with their party email systems. In FIG. 3 the email system is Microsoft's Outlook program, though this is used purely as an illustration since the invention includes integration with all third party email, messaging and collaboration systems.

In FIG. 3, 301 shows user interface for entering a new message into the system as displayed in FIG. 2, 205. 303 shows the entry of a message heading. 304 shows the integration of the message heading and message text with the message heading and text in the email. 305 shows a hyperlink in the third part email software back to the dashboard interface where the data and other messages can be found. An example usage, for the purpose of illustration, would be a business manager using the interface in FIG. 2.

Deciding to add to the discussion of the data shown in FIG. 2, 201, specifically, the manager selects "Write a comment" 206. At this point the user is taken to the user interface shown in FIG. 3 and presented with a blank message template. The user enters a message heading 303 and the message text. Selecting the envelope icon 302 automatically pulls up a blank email message from the users 3 party email system, in this case Microsoft Outlook, and populates the email subject field with the message heading 304, and the message with the text entered by the user into the message template as described above. In addition the system automatically places a hyperlink into the email message to allow the recipient of the email to reference the data, and specifically the user interface shown in FIG. 2.

Figure 4:
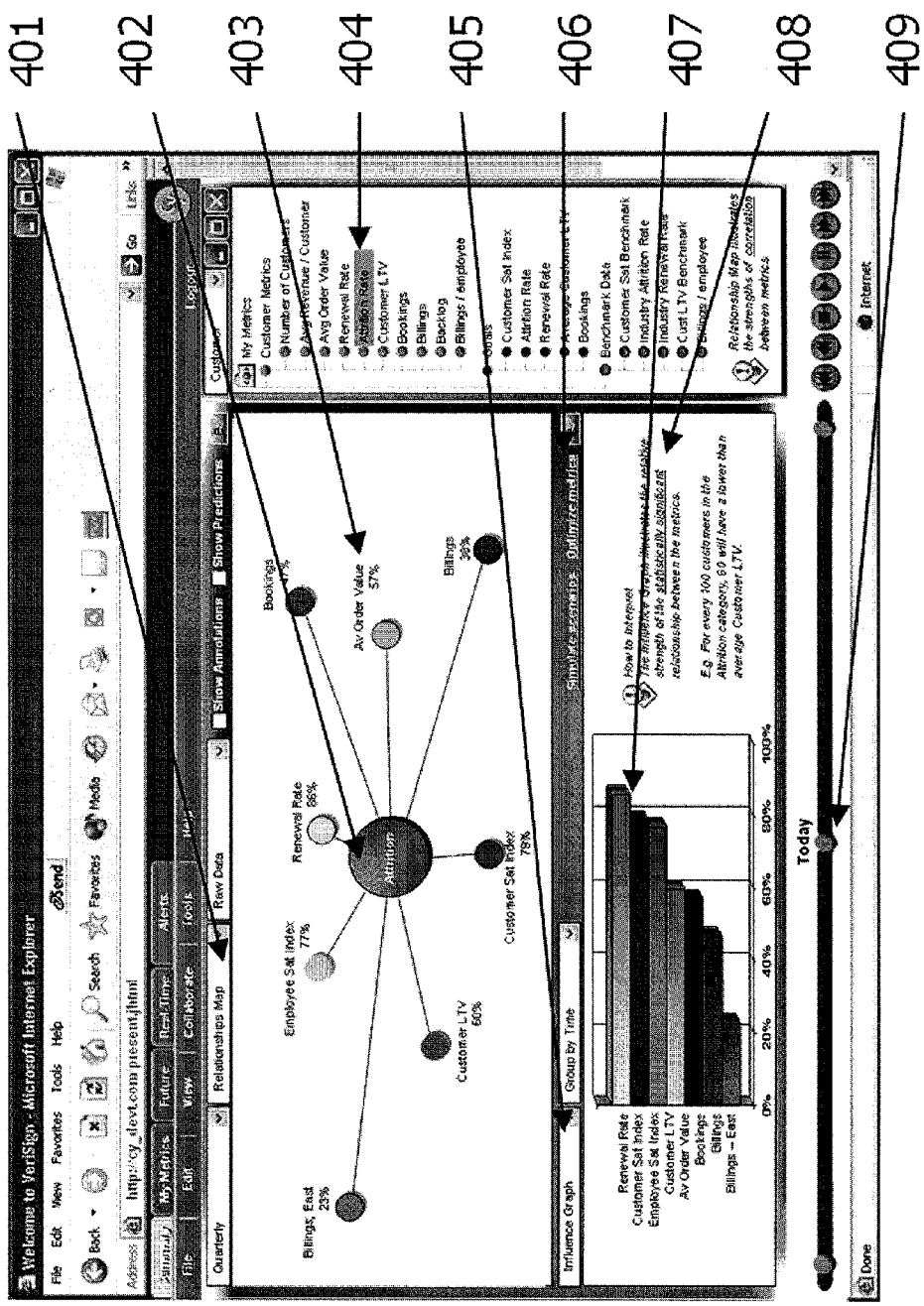
FIG. 4 shows an example user interface of the first embodiment showing metric relationships.

FIG. 4 an example of user interface which represents the strength of respective relationships between metrics. The strength of the relationships are expressed in this case as percentages, but can take other forms. 401 enables the user to shows the relationships graphically 402. The circle at the center of the graphic 402 represents the primary metric selected in the metrics panel 404, in this case "Attrition Rate." Relationships of other metrics 403 are calculated by the invention automatically, and the strongest relationships statistically are shown. Note that selecting a different metric 404 would lead to a different primary metric at the center of the graphic 402, and a different set of relationships with each of the other metrics 403.

Selection of "Influence Graph" 405 enables the user to switch from associated messages (as in FIG. 2, 205) to a different view of the relationship strength, shown here as a descending bar graphic 407. The tool tip 408 provides both help on what the relationship graphics mean, but also how to interpret the data in this particular instance. Note that the example uses data from the example shown. Selecting a different metric 404, the invention would create a different example relevant to the data shown. The time bar 409 controls the time period being examined in the user interface. Note that the strength of different relationships between metrics change over time, and moving the time bar to the left enables the user to compare relationships today with those in the past. Moving the time bar to the right enables the user to project likely relationships in the future.

Figure 5:
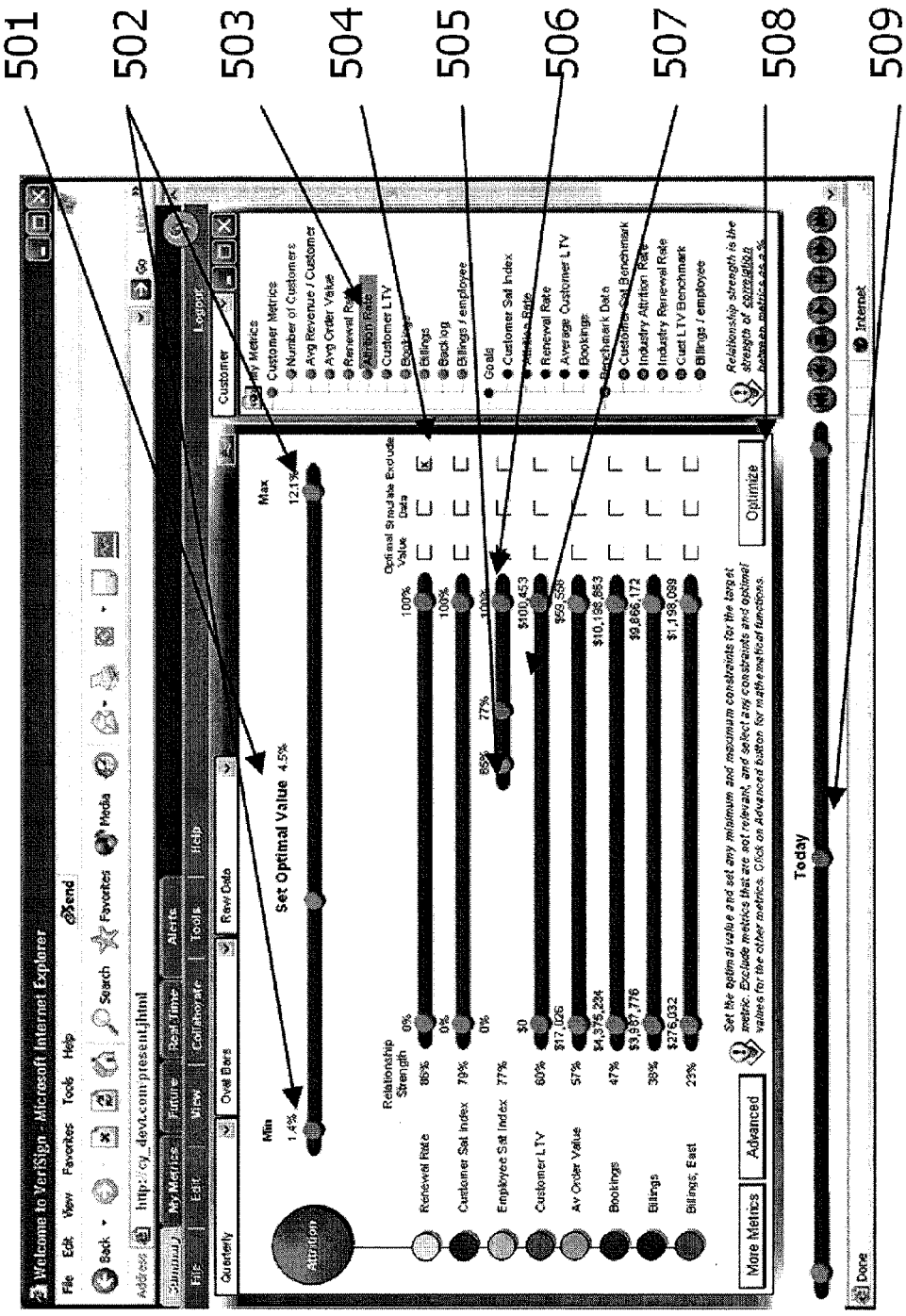
FIG. 5 shows an example user interface of the first embodiment showing optimization of metrics.

FIG. 5 shows an example of user interface which represents the optimization of metrics and setting optimized targets. This user interface is selected by the user from the interface shown in FIG. 4 406. FIG. 5 shows the primary metric, as in FIG. 4 "Attrition Rate" and a slider bar for setting an optimal value. For the purposes of illustration, here is one example of how it might be used.

A marketing manager has been set a goal of managing the attrition rate of a company's customers to 4.5%. From the metrics he selects "Attrition Rate" 503. Using the slider bar 501 he sets the Attrition optimal value to 4.5%. He can set minimum and maximum values as constraints 502, the values of 0% and 12% have already been suggested by the system based on 95 percentile values from historical data.

He sees that the strongest relationship with "Attrition Rate" is with "Renewal Rate" but because he knows that renewals are the inverse of attrition, he chooses to exclude this metric from the optimization process by checking the box 504. In addition, he knows that customer attrition is closely linked to staff satisfaction, so sets the minimum constraint on "Employee Sat Index" to 65% 505 and selects 506 an optimal value of 77% to maintain current performance 507. Selecting the "Optimize" function 508 will then automatically calculate optimized target values in order to achieve an attrition rate of 4.5%. He will then also be prompted as to whether he wishes to set the calculated values as goals, in which case the values would be stored and can then be used to manage the business towards this ideal performance.

Note that use of the time bar 509 enables the user to use the optimization in the future. By setting the date, for example one quarter in advance, optimized goals for the next quarter can be calculated and stored in the system.

Note also that advanced mathematical arguments can also be used by accessing additional user interfaces 510. Such an argument, for the purposes of illustration might be similar to 'If metric "Customer Satisfaction Index" is forecast to fall below 70%, then remove the bottom constraint on metric Customer LTV."

Figure 6:
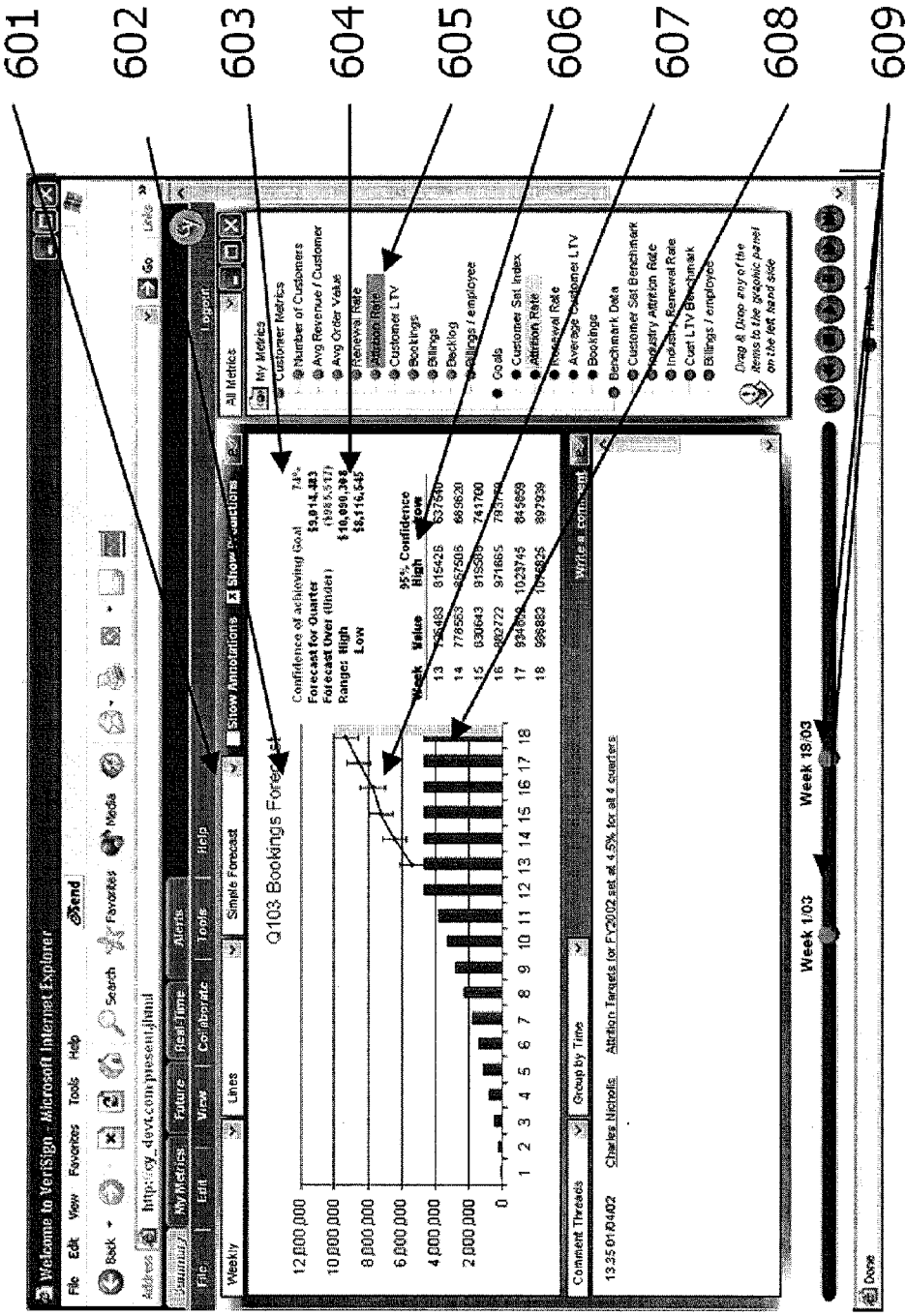
FIG. 6 shows an example user interface of the first embodiment showing forecasting likelihood of hitting goal.

FIG. 6 shows an example of user interface which represents forecasting the likelihood of achieving a particular goal. This is of high business value since it enables business managers to analyze as frequently as they wish their progress towards hitting particular goals. The system automatically updates the forecast based on real-time changing data, enabling the business manager to have an up to the minute and statistically valid projection of future business performance.

The type forecast is selected 601, and for illustration purposes only, FIG. 6 shows a simple statistical forecast, although other techniques are also used by the invention. The period of the forecast in the example is referenced 602 and set by the user using the time bar 609. The graph 608 combines actual cumulative "Bookings" data for weeks one to twelve for the period, with forecast data 607 for weeks thirteen to eighteen. The forecast data 607 also gives a high and low value in addition to the forecast itself, based on a variety of mathematical techniques, and in this example based on plus or minus one standard deviation from the mean giving the user a confidence of 95% of achieving in this range 606 and 607. In addition confidence of achieving the goal itself is given 603, as is a forecast, and range for the quarter, as well as any forecast shortfall or surplus 604.

Figure 7:
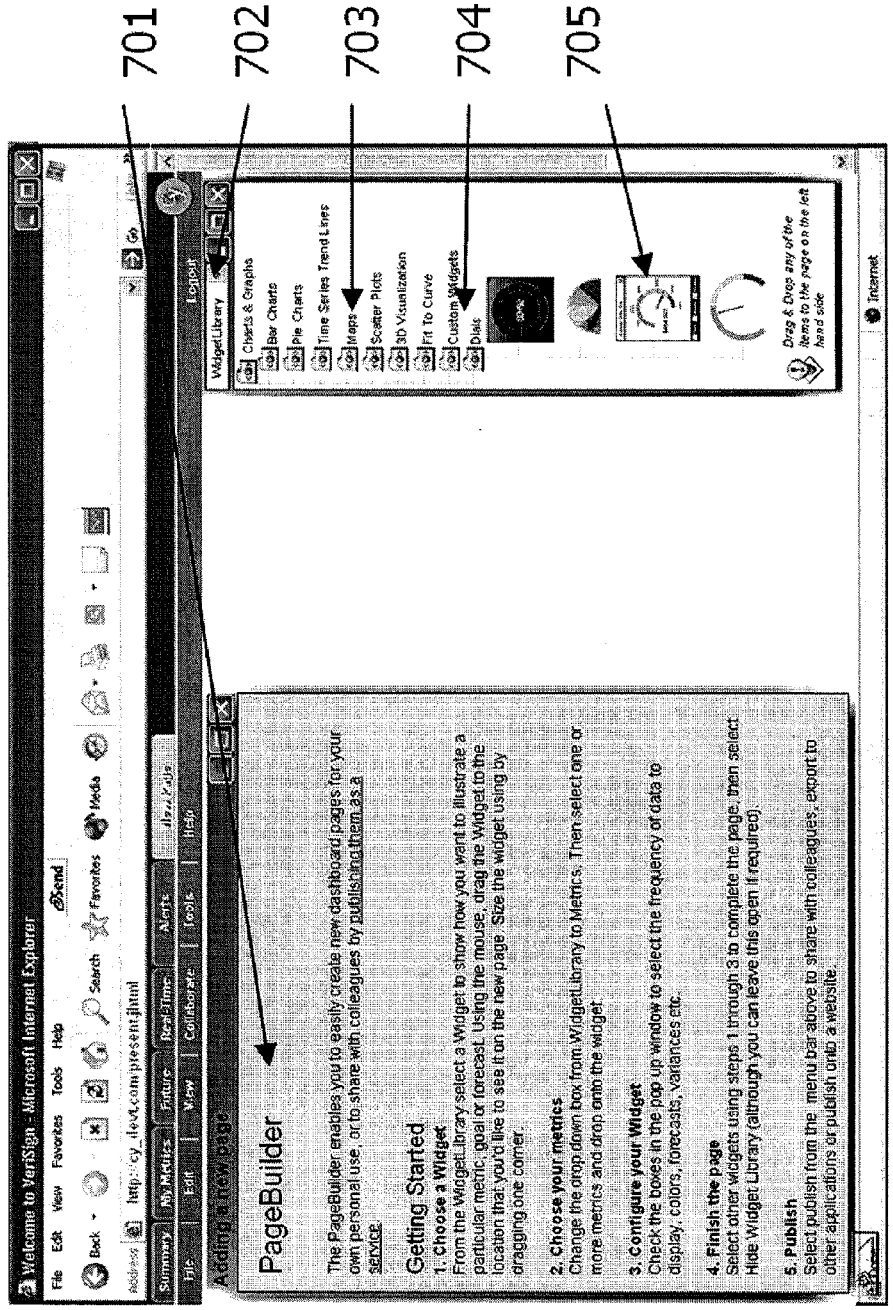
FIG. 7 shows an example user interface of the first embodiment showing drag and drop dashboard builder.

FIG. 7 shows an example of user interface which represents building of a dashboard by business users of the system using, in this example, drag and drop techniques. The example user interface shows a graphical 'dashboard builder' designed to make it very easy for a non-technical user of the system to build personal dashboards and publish dashboards to others. Typically today this is a task for a computer programmer due to the complexity of the task.

In FIG. 7 701 shows the step by step process in detail
choose a widget
choose your metrics
conFigure your widget
finish the page
publish A 'widget' is a graphical device for displaying data, and the invention incorporates a library of widgets 702. This 'WidgetLibrary' consists of different types of widgets 703 including but not limited to Bar Charts, Pie Charts, Time Series Trend Lines, Maps, Scatter Plots, 3D Visualizations, Fit to Curve, Custom Widgets designed by users of the system and third parties, and dials 704. Selecting 'Dials' 704 shows four different types of dial widgets that can be used in building a dashboard. In this example selecting the third dial 705 and dragging it onto the screen left hand side results in an example user interface shown in FIG. 8.

Figure 8:
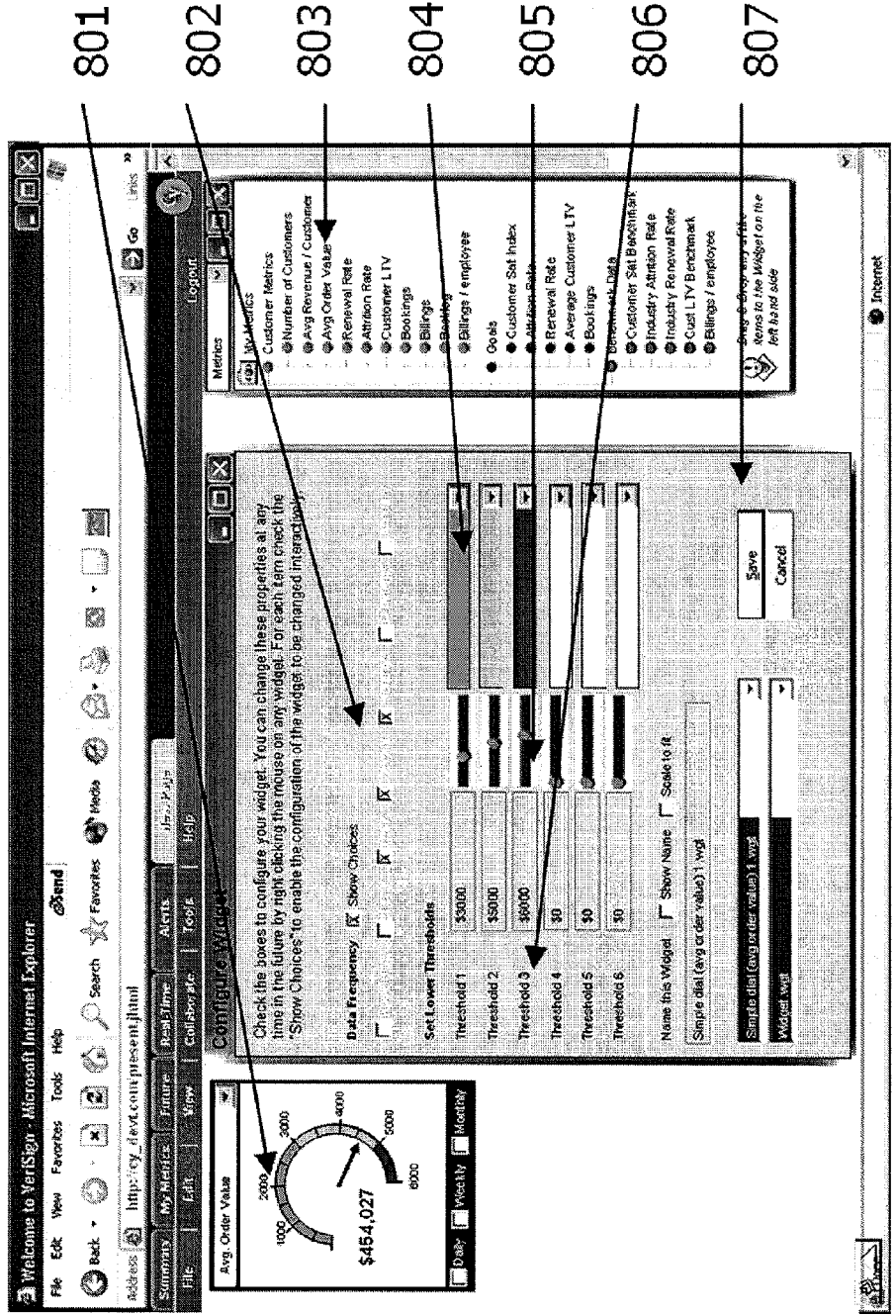
FIG. 8 shows an example user interface of the first embodiment showing configuration of graphical device.

FIG. 8 shows an example of user interface which represents a dashboard being built. The Dial Widget in FIG. 7 705 has now been placed on the screen and sized by the user 801. Selecting and dragging a metric 803 and dropping it onto this widget 801 links it to data, and the "Avg Order Value" 803. On dropping this metric, panel 802 appears which enables the user to configure the widget including the frequency of data for the calculation of the metric used in the display 802, setting of thresholds 806, the use of 'slider bars' 805, and the selection of colors for each of the thresholds. Other widgets use different types of configuration not limited to those in the example given. In each case the system suggests colors, thresholds and names for the widgets to assist the user. 807 enables the user to save the widget so that it can be incorporated into other third party applications.

As described above the product components of the invention are used to Discover metrics and rules, Monitor, Interpret and React to those metrics in real-time, and to automatically Adapt to changing business conditions.

Figure 9:
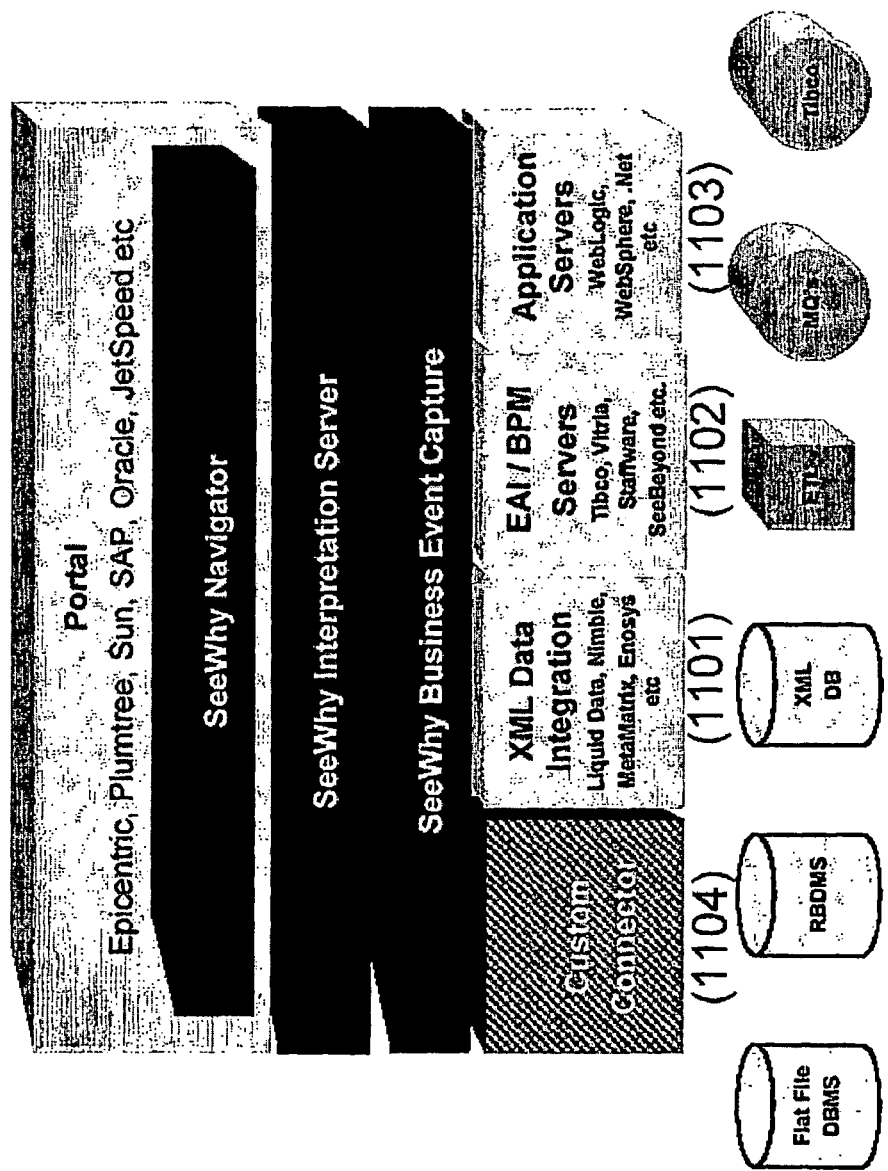
FIG. 9 is a software architecture diagram showing the high level system components of the first embodiment.
Figure 10:
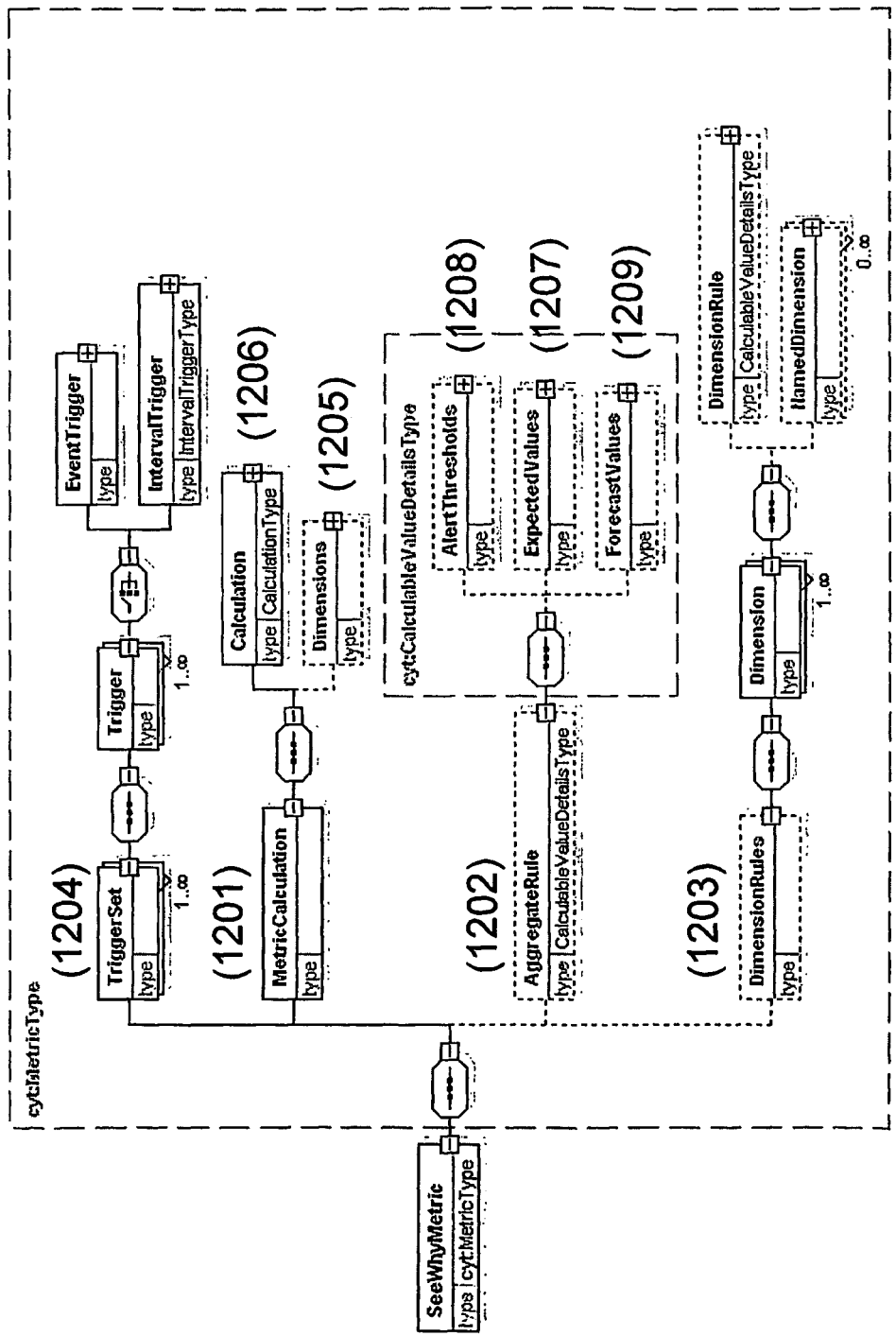
FIG. 10 is a diagram illustrating how the interpretation part of FIG. 9 processes a metric.

The way that it achieves each of these functions is described in more detail below, and illustrated in FIGS. 9 to 11. In FIG. 9, the darker portions represent components which are provided as part of the embodiment whereas the lighter portions represent software commerically available at present from third parties. The "Navigator" portion generates the user interfaces shown and discussed above. The "Business Event Capture" portion executes on the Event Capture Server. "See Why" is the trade mark describing the present embodiment. DB denotes Database, DBMS denotes DB Management System, and RDBMS denotes Relational DBMS.

Discovery

The first step (which is performed when setting up the system for subsequent runtime operation) in preparing a monitoring scenario is to determine the Business Events, Metrics and Rules that are relevant in determining significant business conditions for the specific scenario being analysed. Following this the Actions that will take place when a significant business condition is encountered will be defined. These Events, Metrics and Rules may already be defined in integration systems from which metadata can be imported. The systems is able to import this metadata from a wide variety of types of different middleware technologies, databases and applications as shown in FIG. 9 (1101 through 1104)

This process can be fully manual, fully automated, or somewhere in between.

In the fully manual case (see FIG. 10) the Business Events (1204), Metrics (1201), Rules (1202 & 1203) and Actions are completely user defined, though conforming to the relevant SeeWhy schemas ("SeeWhy" is a trademark denoting the preferred embodiment, and "schema" refers to for example an Extendible Markup Language (XML) schema). These definitions cover the structure of the Business Events, how the Metric, Expected and Forecast values that will be determined from the data contained within those events, and the Rules that will be applied to those values to determine if an Alert state exists, and if so what Actions should be initiated. Dimensions (1205) are also associated with metrics during this process; this specifies at which levels the metric will calculated in addition to the aggregate. For example, adding a dimension of 'Customer' will calculate and evaluate the metric for every customer for whom business events are received (1203).

The ability to calculate new metrics as new dimension instances are encountered enables the system to monitor individual level events, where the precise content of the event is not known before it happens. By way of example, a shipping company sends packages across the Atlantic by air. To have to define rules for each individual package would be impossible. The ability to track each unique shipment number automatically as it appears in the system, and create a forecast for the shipments arrival at certain points on the route is commercially valuable. If an operator had to be involved in the process every time a new shipment was added, this would be a significant disadvantage compared with performing the calculation automatically.

In fully automated discovery the same information is derived from Historical Data, Transaction and Process Metadata, Automated Workflows, and Business Goals and Targets, all of which are imported from existing applications. In this case the first step is to take all transaction and reference data along with the goals and targets that represent the desired operational characteristics over the period to be monitored. The application of standard data mining components can then define which data is required to accurately determine model derived metric values, to determine time series derived expected values, and to accurately forecast future values.

Knowing now the data that is required the Business Events that must be published to the SeeWhy product interface can be determined with reference to external metadata. This results in the production of an XML schema definition for deployment to the integration layer.

The Actions to initiate when a significant deviation from the desired operational conditions is detected can then be assigned to existing modelled and automated work-flows.

In both of these scenarios both IT and Business User/Analyst resources will be required, though the emphasis is very much on making this primarily a Business User tool.

For example, in the manual discovery process the Business User could define their metrics and rules without reference to the feasibility of capturing the necessary business event data. Once the Business User has completed the definitions these then being passed to IT for the Events to be constructed and the relevant mappings and routing added to the Integration Layer, however a more efficient approach would be for the IT and Business Users to work in concert from the start.

In the case of an automated discovery process IT must first enable the links to historical data, and metadata and insert appropriate transformation and routing points within the Integration Layer. Once done, in the normal course of events no further IT involvement should be required, as Business Users will change the system by adjusting or defining new goals and targets, these in turn may modify metrics and rules, and potentially deploy new or modified events to the Integration Layer.

However as this deployment may impact other operations it is likely IT will wish to be in the loop.

Monitor, Interpret and React

In operation the system is driven by the receipt of external business events and scheduled time events. When the defined sequence of business and/or timer events associated with a particular metric occur the Interpretation Process begins.

Figure 11:
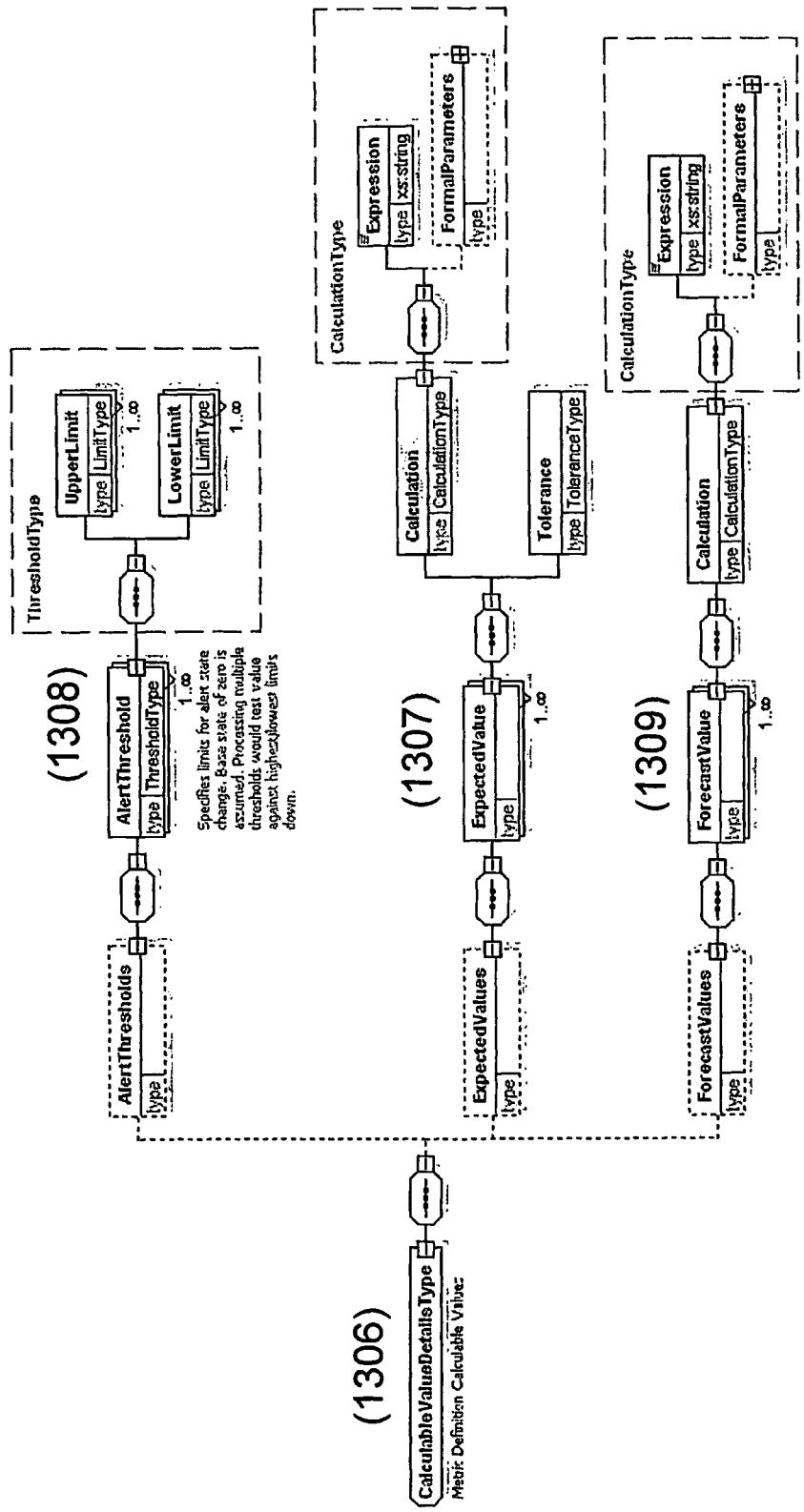
FIG. 11 is a diagram illustrating detail of a calculable type in the embodiment of FIG. 9.

This process is shown in more detail in FIG. 11.

The metric's current actual (1206) and expected values (1207 & 1307) are determined via the specified calculations or discovered models. The actual value is then compared against user defined thresholds (1208 & 1308) and against the expected value (1207 & 1307) within user defined or system calculated tolerances. Next, future values of the metric at points aligned with business goals are forecast (1209 & 1309), and compared to the values of those business goals, again within user defined or system calculated tolerances. The forecast value trend is also projected forward looking for an intersection point with the expected value trend. Any user defined rules associated with this metric are also evaluated.

Note that there may be multiple methods and tolerances defined for expected and forecast value determination.

Based on this interpretation Alert States associated with the Metric will be set for:

Actual Value v Expected Values
  Actual Value v Threshold Values
  Forecast Values v Business Goals
  Forecast Values v Forecast Expected Values
  User Rules When an alert state change takes place any associated actions will then be initiated.

This process occurs both at the Aggregate level of the Metric and for each instance of all defined Dimensions. The interpretation rules to apply at the Aggregate, Dimension and Dimension instance level are specified separately.

Adaptation

As well as the user adjustment of thresholds, tolerances, rules etc. the system also automatically adapts as new data is received.

Where metrics are being determined by a mined analytical model this can be constantly updated as new data is received, alternately the accuracy of determined values can be tracked against measured values and only when model decay is detected will regeneration take place. In the same manner, where expected values are being determined via a mined time series or other model and a systematic deviation from the actual trend is detected the model will be regenerated. And where values are being forecast, the forecast model can always take into account the latest data or wait until decay in the model is detected.

Additionally, calculations and rules defined at the metric and dimension levels respectively are used as the default for all new instances of a dimension. Therefore it is not necessary to define all entities in advance in the system, so for example when a new customer is encountered all metrics with a customer dimension will automatically start being tracked for that customer. For metrics associated with a transient dimension, for example a 'Container Shipment', the metric is tracked from the first event associated with that shipment until the receipt of a specified termination event.

Additional Information on the Preferred Embodiment

Figure 12:
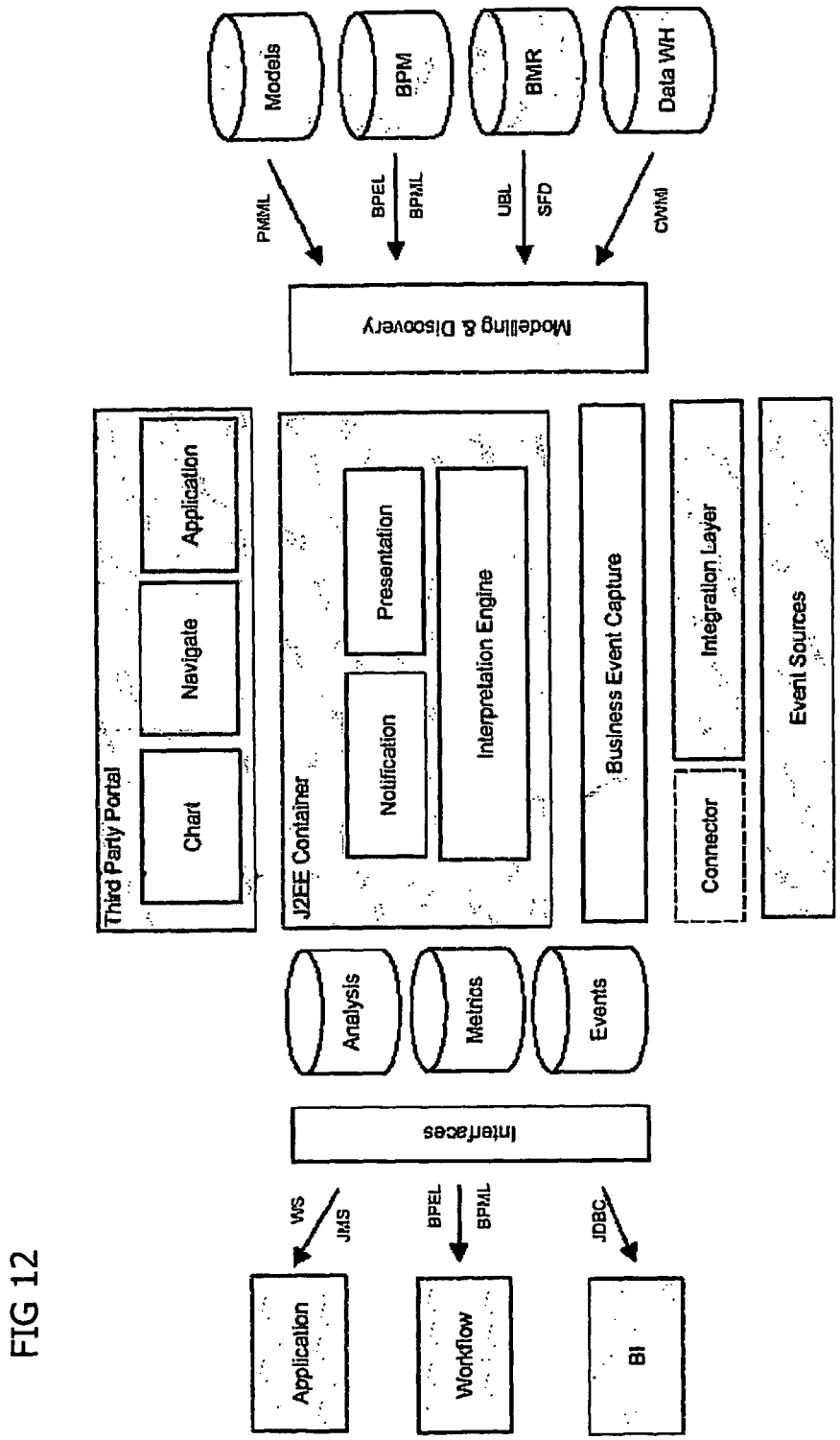
FIG. 12 is an alternative high level architecture diagram showing the software components of the first embodiment.

FIG. 12 shows in greater detail the software components present in the first invention. On the database server computer 4000 are stored databases of the events (i.e. the incoming historical raw business data), the metrics (i.e. the calculated values of the metrics derived from the raw data) and the analysis results.

The interpretation server computer 500 in this embodiment runs a Java environment (J2EE) which supports an interpretation engine for calculating metrics and so on; a notification program for notifying calculated results; and a presentation program for generating the user interface display which are shown in the earlier Figures, and making them available to browsers on the terminals 1000. In these Figures, the darker grey denotes programs which are already commercially available from third parties, and the lighter grey those which are provided as part of this embodiment of the invention.

As shown, the interpretation engine can take modeling and discovery data from a range of external sources where these are available. These include models (i.e. analytical models, e.g. a data mining statistics tool like SAS); business process modeling (BPM) tools (i.e. SAVIION), business metadata repositories (BMR), or data warehouse (WH). Thus, where a business already has some aspects of a business model defined in metadata, from COGNOS or Business Objects and so on, the embodiment can import such data and use it to provide new metrics, or new dimension instances.

The event channel server computer 3000 can capture business events either through a specialised connector program or through a third party integration layer from the event sources 6000.

The metrics, alerts and other data can be propagated to or queried by external programs such as a workflow program for monitoring work flow, a business intelligence (BI) program such as Business Objects, or some other application. The data can also be supplied to some third party portal for use with a third party application, as well as charting a navigation modules for visually displaying the data.

Figure 13:
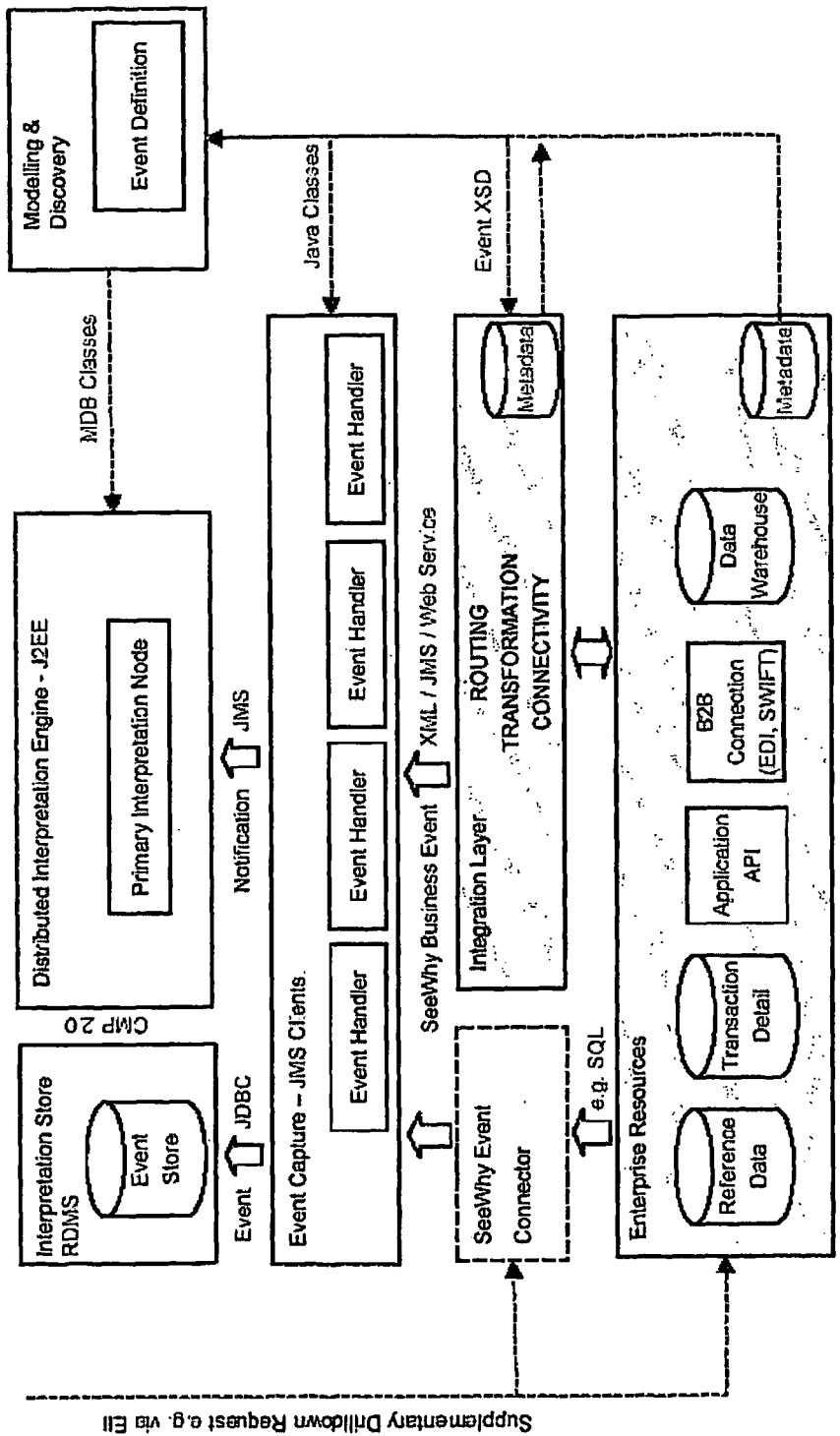
FIG. 13 is an architecture diagram showing in greater detail the software components making up the event capture and modelling parts of that of FIG. 12.

FIG. 13 shows in greater detail the processing of events from outside sources, in a range of signalling formats such as JDBC, JMS, XML, SQL and so on. Each event is assigned an event handler routine which appropriately forwards the event to the interpretation program.

Figure 14:
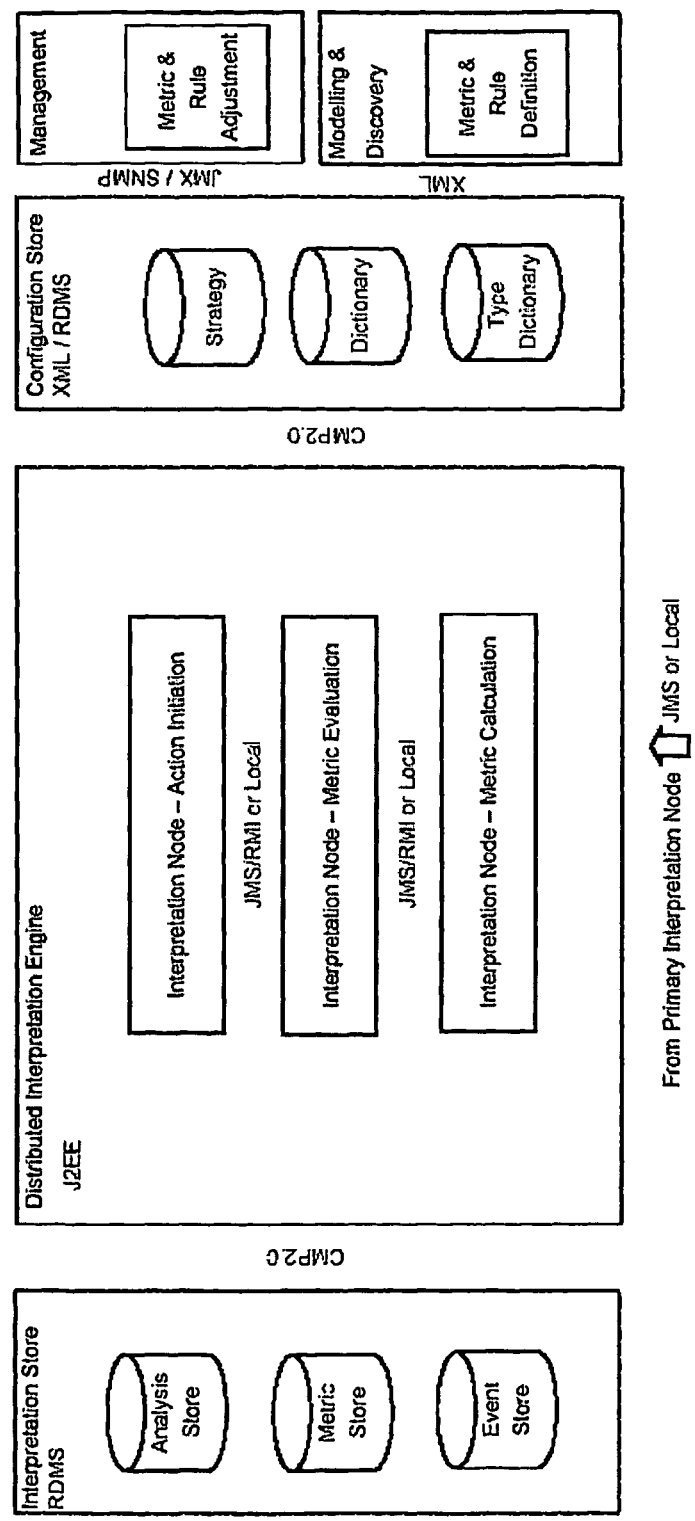
FIG. 14 is an architecture diagram showing in greater detail the software components making up the interpretation parts of that of FIG. 12.

FIG. 14 shows in greater detail the interpretation component. Each metric or rule has a corresponding Interpretation Node module which acts to process the events making up the metric. A node may calculate a metric, evaluate a metric or initiate an action (such as an alert) based on a metric, in each case by processing an incoming event and the predefined historical data which is associated with it, in accordance with the calculations programmed for that metric, rule, or alert, as shown in FIGS. 10 and 11. A node referred to as the "primary interpretation node" in FIGS. 13 and 14 determines how new incoming data event will be handled.

Figure 15:
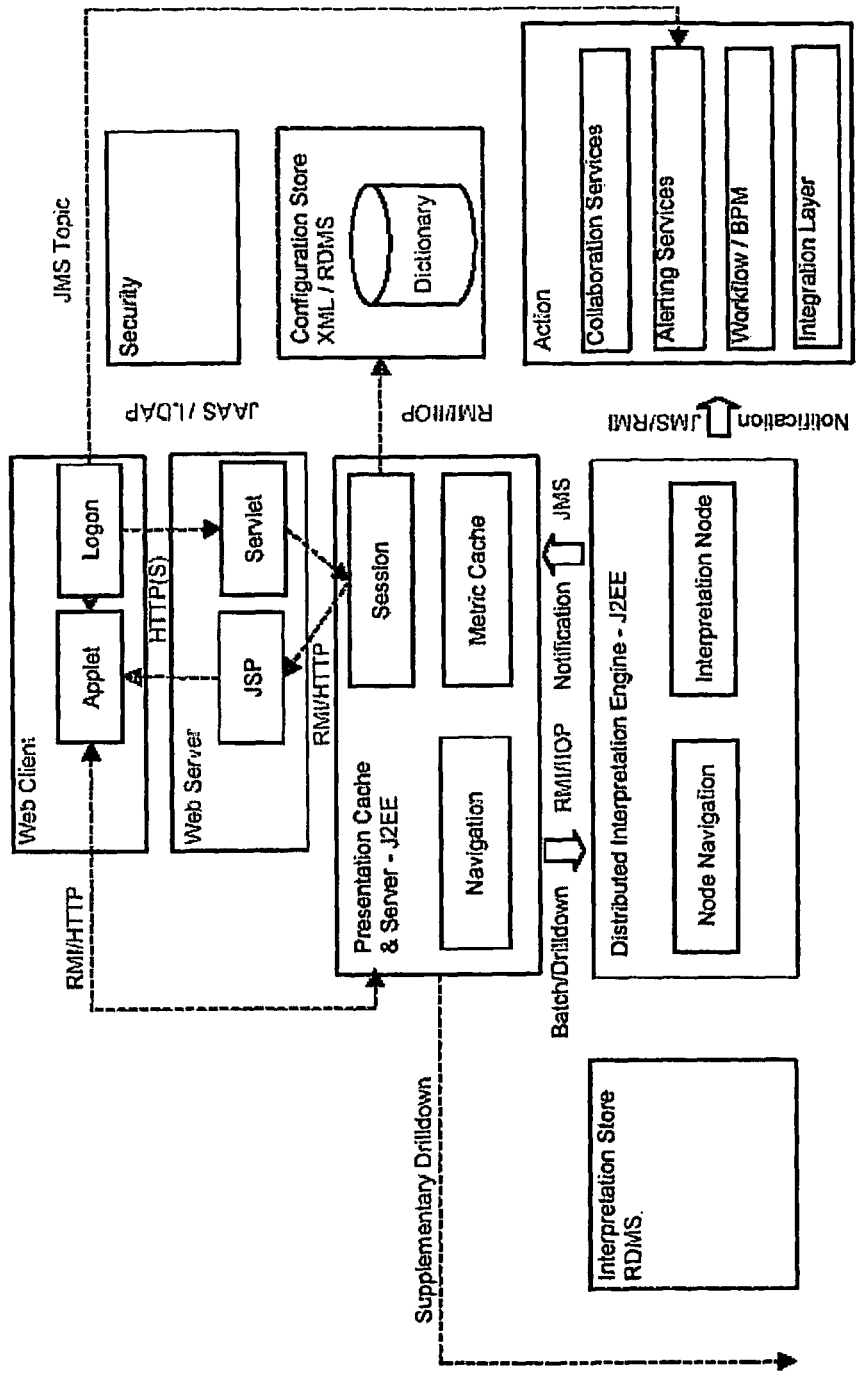
FIG. 15 is an architecture diagram showing in greater detail the software components making up the notification and presentation parts of that of FIG. 12.

FIG. 15 shows in greater detail the notification and presentation components. A Web client at each terminal 1000 comprises a standard browser program such as Microsoft™ Intenet Explorer™ which is arranged to download and run an applet on logging on to the network 2000. The applet is supplied by a web server program running on the interpretation server 5000, and thereafter during the session whilst the terminal is logged on it communicates via a secured (HTTPS) link with the web server. The navigation component generates, for each terminal 1000, the corresponding dashboard display containing the appropriate data showing the data which is required by the user of that terminal (i.e. the relevant sales, marketing or inventory data for the user who has responsibility for it). The navigation component is notified when a metric changes, and accordingly changes the display for the terminals affected, so as to update in real-time, in an event-driven fashion.

Where a user interacts with the applet to request more information (i.e. to drill down to more detail) this request is passed back to the navigation component to cause that user to be notified of the extra metric which is now required.

Separately, using the Java Messaging Service (JMS) the terminal communicates with collaboration and other programs, so that if the user communicates a message, or initiates an action, this is communicated to the other user terminals affected (as disclosed above).

The present invention has been described in connection with certain embodiments these embodiments are merely illustrative, and not restrictive, of the invention, and it will be understood that various modifications can be made to the above-described embodiments without departing from the spirit and scope of the invention, as defined in the appended claims, or any alternatives thereto that would be obvious to the skilled reader. For the avoidance of doubt, protection is sought for any and all novel subject-matter herein and combinations thereof, whether claimed on filing or not.

It should be apparent that the concepts comprising the system of the present invention may be implemented in many different ways using various applications, databases, computer platforms, middleware, devices etc. Moreover the present invention can be practiced with one or more processes or functions of the invention located remotely from the other processes or functions. For example, a user can be in one geographic location operating a user interface according to the present invention while the data is stored in a database which is geographically distant. The user can communicate with the database vis-A-vis user interface, for example using a computer network.

The invention claimed is:

1. A computer system for managing data, the system comprising:
a memory storing historical data comprising continuously updated values for each of a plurality of metrics at a plurality of points in time; and
at least one computer configured to:
from one or more external sources, receive a continuous stream of event data for at least one of the metrics, wherein the event data is transmitted to and received by the at least one computer independent of a request from the computer,
in response to each received event data, calculate with the computer an actual value for at least one metric based at least in part on the event data, wherein the actual value is calculated based on a first sliding time window, and represents a current state of the at least one metric,
in response to each received event data, automatically calculate with the computer a computed value for the at least one metric, wherein the computed value is calculated based on a second sliding time window, and represents an expected state of the at least one metric at a time corresponding to a time associated with the actual value,
compare the computed value with the actual value, and
determine whether to generate an alert or action based on the comparison of the computed value and the actual value,
wherein the computed value is calculated in response to each received event data, and the computed value is calculated based at least in part on the second sliding time window being defined relative to and inclusive of a time the received event data prompting the automatic calculation was received and further defined by one or more of:
a time of a most recently received event data of the continuous stream of event data,
a last hour of the continuous stream of event data,
a last number of hours, x, of the continuous stream of event data, where the number of hours, x, has been stored in the computer system,
another metric that has been stored in the system,
a stored last number of a particular day of the week, thereby including data only from those particular days of each week on which the continuous stream of event data was received,
a stored last number of a particular day of the month, thereby including data only from those particular days of each month on which the continuous stream of event data was received, and
a stored last number of a particular day of the year, thereby including data only from those particular days of each year on which the continuous stream of event data was received.

2. The system according to claim 1, wherein the at least one computer is arranged to store one or more rules for operating on at least one of the received event data, the actual value, the computed value, and the comparison of the actual value and the computed value and wherein a metric is part of the rules and the metric is defined by an operator.

3. The system according to claim 1, wherein the at least one computer is arranged to store one or more alert definitions for causing a signal to be sent according to the rules, wherein criteria for the rules is determined either by a fixed value, or by a dynamic metric in the system.

4. The system according to claim 3, wherein the at least one computer is arranged to send a message to a terminal selected based on the alert.

5. The method of claim 1, wherein the metrics are defined by an operator of the computer system.

6. The method of claim 1, further comprising reporting the comparison of the computed value and the actual value.

7. The method of claim 1, further comprising:
notifying one or more users of the computer system of the alert or action;
storing status information to reflect the priority of the alert or action;
storing information related to the alert or action;
storing status information after the action has been taken; and correlating previous actions taken with performance and achievement of goals.

8. A computer system for managing data relating to the performance of an enterprise, the system comprising:
- a memory storing historical business data comprising values of each of a plurality of metrics at a plurality of points in time; and
- at least one computer configured to:
  - from one or more external sources, receive a continuous stream of event data for at least one of the metrics, wherein the event data is transmitted to the at least one computer independent of a request from the computer,
  - in response to each received event data, calculate with the computer an actual value for at least one metric based at least in part on the event data, wherein the actual value is calculated based on a first sliding time window, and represents a current state of the at least one metric,
  - in response to each received event data, calculate with the computer a computed value for the at least one metric based on the historical business data. wherein the computed value is calculated based on a second sliding time window and represents an expected state of the at least one metric at a time corresponding to a time associated with the actual value,
  - wherein the computed value is calculated in response to each received event data, and the computed value is calculated based at least in part on the second sliding time window being defined relative to and inclusive of a time the received event data prompting the automatic calculation was received and further defined by one or more of:
    - a time of a most recently received event data of the continuous stream of event data,
    - a last hour of the continuous stream of event data,
    - a last number of hours, x, of the continuous stream of event data, where the number of hours, x, has been stored in the computer system,
    - another metric that has been stored in the system,
    - a stored last number of a particular day of the week, thereby including data only from those particular days of each week on which the continuous stream of event data was received,
    - a stored last number of a particular day of the month, thereby including data only from those particular days of each month of which the continuous stream of event data was received, and
    - a stored last number of a particular day of the year, thereby including data only from those particular days of each year on which the continuous stream of event data was received.

9. The method of claim 1, further comprising:
automatically generating associating a dimension of the metric;
automatically generating associating additional individual level metrics, without operator involvement where the individual level dimension has not been explicitly defined previously or by an operator;
automatically interpreting the new metric over time; and
automatically calculating another computed value.

10. A computer system for managing data, the system comprising:
- a memory storing historical data comprising continuously updated values for each of a plurality of metrics at a plurality of points in time; and
- at least one computer configured to:
  - from one or more external sources, receive a continuous stream of retail sales event data, wherein the retail sales event data is transmitted to and received by the computer independent of a request from the computer,
  - in response to each received retail sales event data, calculate with the computer an actual retail sales volume value for a retail sales volume metric based at least in part on the retail sales event data, wherein the actual retail sales volume value is calculated based on a first sliding time window, and represents a current state of the retail sales volume metric,
  - in response to each received retail sales event data, automatically calculate with the computer a computed value for the retail sales volume, wherein the computed value is calculated based on a second sliding time window, and represents an expected state of the current retail sales volume at a time corresponding to a time associated with the actual retail sales volume value,
  - compare the computed value with the actual value, and
  - determine whether to restock or to change the price of a product based on the comparison of the computed value and the actual value,
  - wherein the computed value is calculated in response to each received event data, and the computed value is calculated based at least in part on the second sliding time window being defined relative to and inclusive of a time the received event data prompting the automatic calculation was received and further defined by one or more of:
    - a time of a most recently received event data,
    - a last hour of the continuous stream of retail sales event data,
    - a last number of hours, x, of the continuous stream of retail sales event data, where the number of hours, x, has been stored in the computer system,
    - another metric that has been stored in the system,
    - a stored last number of a particular day of the week, thereby including data only from those particular days of each week on which the continuous stream of event data was received,
    - a stored last number of a particular day of the month, thereby including data only from those particular days of each month on which the continuous stream of event data was received, and
    - a stored last number of a particular day of the year, thereby including data only from those particular days of each year on which the continuous stream of event data was received.

11. The computer system of claim 10, wherein the retail sales event data comprises a retail sale of the product.

12. The computer system of claim 10, wherein the retail sales volume metric comprises a sales rate of the product, and the actual retail sales volume value comprises a sales rate of the product over the sliding time window.

* * * * *